Nov. 30, 1926.
J. DYKEMA
POULTRY FOUNT
Filed July 15, 1926
1,609,071
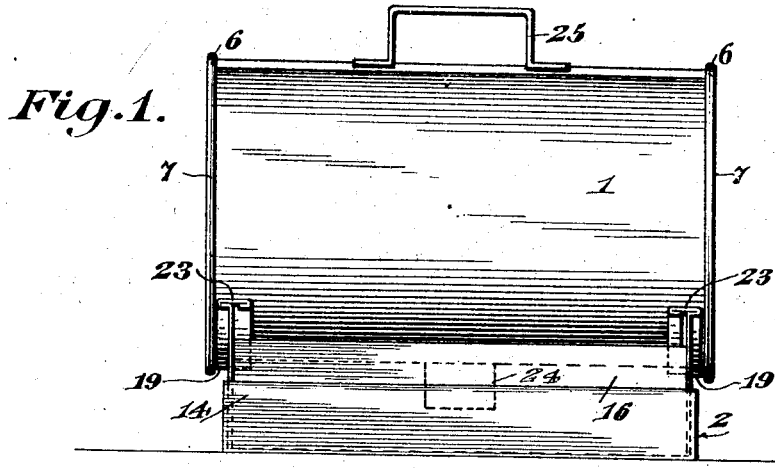
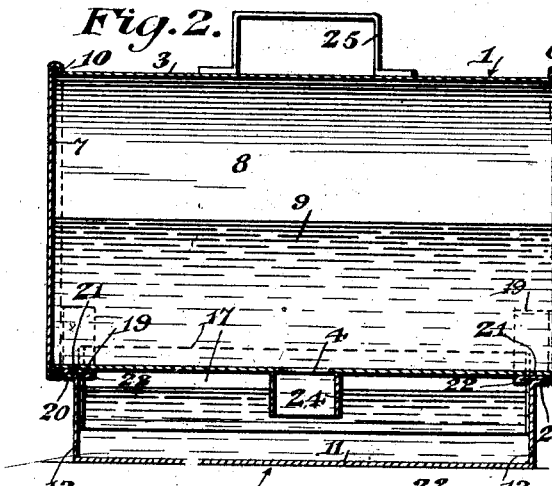
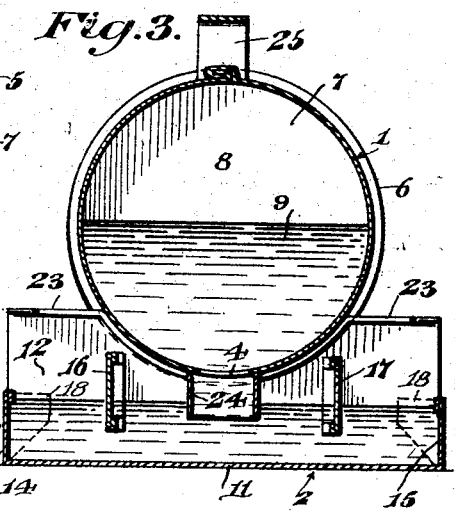
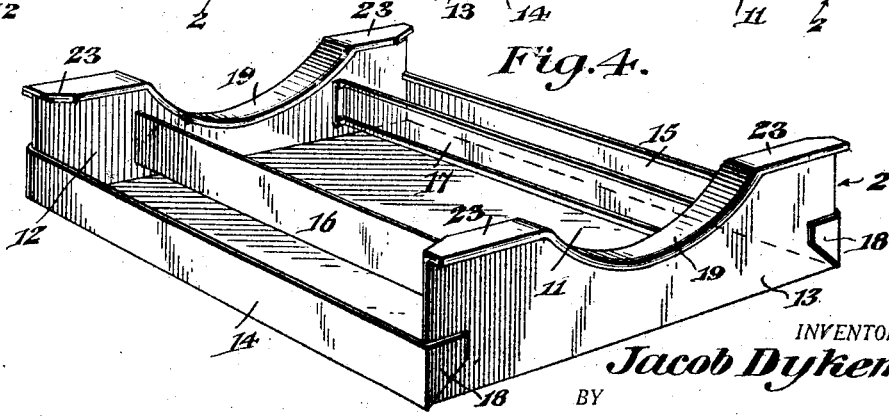
INVENTOR.
Jacob Dykema,
BY
Geo. P. Kimmel
ATTORNEY.

Patented Nov. 30, 1926.

1,609,071

UNITED STATES PATENT OFFICE.

JACOB DYKEMA, OF ASHKUM, ILLINOIS.

POULTRY FOUNT.

Application filed July 15, 1926. Serial No. 122,669.

This invention relates to a poultry fount and has for its object to provide a device of such class, in a manner as hereinafter set forth, whereby the supply of water is automatically fed into a trough so that the supply of water therein is constant at all times.

A further object of the invention is to provide, in a manner as hereinafter referred to, a poultry fount including a reservoir and a trough and with the former opening into the latter for discharging water therein and with the reservoir and trough having coacting means to prevent the accidental displacement of the reservoir relative to the trough by the fowls.

Further objects of the invention are to provide, in a manner as hereinafter set forth, a poultry watering device, which is simple in its construction and arrangement, strong, durable, compact, thoroughly efficient in its use, permitting of a number of fowls drinking at the same time, readily assembled, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of a poultry fount in accordance with this invention.

Figure 2 is a longitudinal sectional view thereof.

Figure 3 is a horizontal sectional view thereof.

Figure 4 is a perspective view of the can or trough.

A poultry watering device, in accordance with this invention, comprises a water container and a drinking pan or trough and with the former positioned relatively to the latter to provide for a constant flow of water from the container into the pan or trough.

The container is in the form of a cylindrical receptacle 1 of a length greater than the length of the pan referred to generally by the reference character 2. The receptacle 1 consists of a cylindrical body portion 3 formed with an outlet opening 4. The body portion 3 at each end is provided with a laterally extending annular flange 5 which is overlapped by the inturned marginal portion 6 of a circular disk 7. The disks 7 provide the closed end walls of the receptacle 1. The body portion 3 in connection with the end walls 7 form a reservoir 8 for water 9 which is discharged through the outlet 4. Each disk 7 is of greater diameter than the diameter of the body portion 3 whereby each disk will project laterally from said body portion and the inturned part 6 of each disk 7 forms an abutment 10 for a purpose to be presently referred to.

The pan or trough 2 is of rectangular contour, but of less length than the length of the receptacle 1, but the width of the pan 2 is greater than the diameter of the body portion 3 of the receptacle 1. The pan 2 includes a bottom 11, a pair of end walls 12, 13 and a pair of side walls 14, 15. Arranged within the pan 2 is a pair of spaced partition members 16, 17 which extend from the end wall 12 to the end wall 13 and are spaced inwardly from the side walls 14 and 15. The partition members 16 and 17 are spaced a substantial distance above the bottom 11 and also project above the top edges of the side walls 14 and 15. The side walls 14 and 15 are an integral part of the bottom 11, are bent upwardly to abut against the vertical edges of the end walls 12 and 13, and each side wall is provided at each end with an inturned portion 18 which is secured to the outer face of an end wall, see Figure 4.

The top of each end wall is formed with a semi-circular concavity 19. The concavities 19 are arranged in alinement and disposed centrally with respect to said end walls. The upper portion of each end wall is bent outwardly at right angles as at 20 and then rearwardly upon the upper face of the portion 20 as at 21 and said portion 21 extends inwardly with respect to its end wall and is then bent upon itself to engage the lower face thereof as at 22.

The bent portions 20, 21 and 22 of each end wall provides the top thereof, from end to end, with a ledge 23 see Figure 4 and which conforms in shape to the upper end of its respective wall. The ledge 23 extends forwardly and rearwardly with respect to its associated end wall. The ledges 23 provide supports for the ends of the receptacle 1, that is to say the concaved part of each of said ledges. When the receptacle 1 is mounted upon the concaved portions of the ledges 23 the end walls 7 of said receptacle 1 are positioned exteriorly with respect to the outer edges of said ledges whereby if the receptacle 1 shifts in one direction an abutment 10 will engage in an edge of the ledge and arrest the shifting movement of the receptacle and this action takes place when the receptacle 1 is shifted in the opposite direction. The ledges 23 provide broad supporting surfaces for the receptacle 1.

The body portion 3 of the receptacle 1 has formed integral therewith a discharge spout 24 which surrounds and is spaced from the opening or outlet 4, and when the receptacle 1 is mounted upon the ledges 23, said spout 24 depends into the pan 2 centrally thereof and between the partition members 16 and 17. The body portion 3 on that side opposite the side to which the spout 24 is connected, has secured therewith a handle member 25 to facilitate the removal of the receptacle 1 when desired, more especially when the receptacle has its contents completely discharged and it is to be replenished with water.

The side walls 14 and 15 of the pan are of such height as not to interfere with the fowls drinking. When the receptacle 1 is in the position shown in Figure 2 whereby the water 9 will be discharged into the pan 2, the latter will not run over, as it is water-sealed and the water remains at the same level until the reservoir is empty.

The partitions 16 and 17, shield or prevent the small chicks from drowning, and further brace and support the end walls 12 and 13.

The pan can be readily cleaned before each filling thereby providing for sanitation. Owing to the construction of the pan it permits of the fowls drinking from each side thereof which forms a large drinking space for the chicks.

It is thought that the many advantages of a poultry fount, in accordance with this invention, can be readily understood, and although the preferred embodiment of the invention is as illustrated and described yet it is to be understood that changes in the details of construction can be had which will fall within the scope of the invention as claimed.

What I claim is:

1. A poultry fount comprising a drinking pan including a bottom, side and end walls and a pair of spaced partition members secured to the end walls and spaced inwardly of the side walls and above said bottom, said end walls having a concaved portion in the top thereof, and a water container discharging into said pan between said members mounted in said concaved portions and extended from said end walls, said container having each of its ends provided with means associated with an end wall to arrest the lengthwise shifting of the container relative to said pan.

2. A poultry fount comprising a drinking pan including a bottom, side and end walls and a pair of spaced partition members secured to the end walls and spaced inwardly of the side walls and above said bottom, said end walls having a concaved portion in the top thereof, a water container discharging into said pan between said members mounted in said concaved portions and extended from said end walls, said container having each of its ends provided with means associated with an end wall to arrest the lengthwise shifting of the container relative to said pan, said side walls of less height than said end walls and said partition members projecting above the top edges of said walls.

3. A poultry fount comprising end walls, each of said end walls having inherent means at the top thereof to provide a ledge forming a relatively broad supporting surface extending outwardly and inwardly with respect to the end wall, each of said end walls further having a concavity centrally of the top thereof, and a water container discharging into said pan, mounted in said concaved portions and extended from the said end walls, said container having its ends provided with means associating with the outer edges of said ledges to arrest the lengthwise movement in either direction of said container relative to said pan.

4. A poultry fount comprising end walls, each of said end walls having inherent means at the top thereof to provide a ledge forming a relatively broad supporting surface extending outwardly and inwardly with respect to the end wall, each of said end walls further having a concavity centrally of the top thereof, a water container discharging into said pan, mounted in said concaved portions and extended from the said end walls, said container having its ends provided with means associating with the outer edges of said ledges to arrest the lengthwise movement in either direction of said container relative to said pan, and a pair of spaced partition members secured to the inner faces of said end walls, spaced from said side walls and further spaced above the bottom of said pan and projecting above the top edges of said side walls.

5. A poultry fount comprising a drinking pan including side and end walls, each of the end walls at the top thereof formed with a concaved portion, a cylindrical water container mounted in said concaved portions and extending lengthwise with respect to said pan and further projecting from each of said end walls, said container having means for discharging the water therefrom into said pan and further having means at each end thereof arranged exteriorly of the end walls and coacting therewith to arrest the lengthwise shifting of the container, in either direction, with respect to said drinking pan, and a handle secured to said container between the ends thereof.

In testimony whereof, I affix my signature hereto.

JACOB DYKEMA.